(12) United States Patent
Li et al.

(10) Patent No.: US 11,662,925 B2
(45) Date of Patent: May 30, 2023

(54) DATA PROCESSING METHOD AND DISTRIBUTED STORAGE SYSTEM

(71) Applicant: HUAWEI CLOUD COMPUTING TECHNOLOGIES CO., LTD., Gui'An New District (CN)

(72) Inventors: Xinjie Li, Dongguan (CN); Rongfeng He, Shenzhen (CN); Bin Zhu, Shenzhen (CN); Suhong Wu, Shenzhen (CN); Xieyun Fang, Shenzhen (CN)

(73) Assignee: HUAWEI CLOUD COMPUTING TECHNOLOGIES CO., LTD., Gui'An New District (CN)

( * ) Notice: Subject to any disclaimer, the term of this patent is extended or adjusted under 35 U.S.C. 154(b) by 0 days.

(21) Appl. No.: 17/238,709

(22) Filed: Apr. 23, 2021

(65) Prior Publication Data

US 2021/0240374 A1    Aug. 5, 2021

Related U.S. Application Data

(63) Continuation of application No. PCT/CN2019/105703, filed on Sep. 12, 2019.

(30) Foreign Application Priority Data

Oct. 26, 2018 (CN) .......................... 201811260310.1

(51) Int. Cl.
*G06F 3/06* (2006.01)
*G06F 1/3228* (2019.01)
(Continued)

(52) U.S. Cl.
CPC .......... *G06F 3/0634* (2013.01); *G06F 1/3228* (2013.01); *G06F 1/3268* (2013.01);
(Continued)

(58) Field of Classification Search
None
See application file for complete search history.

(56) References Cited

U.S. PATENT DOCUMENTS 6,567,891 B2 * 5/2003 Oldfield .............. G06F 11/1076
714/6.24
7,188,236 B2 * 3/2007 Martinez ............... G06F 9/4418
713/1
(Continued)

FOREIGN PATENT DOCUMENTS

CN    104008075 A    8/2014
CN    104536904 A    4/2015
(Continued)

OTHER PUBLICATIONS

Adam Manzanares et al.,"Energy Efficient Prefetching with Buffer Disks for Cluster File Systems",2010 39th International Conference on Parallel Processing,total 10 pages.
(Continued)

*Primary Examiner* — Brian R Peugh
(74) *Attorney, Agent, or Firm* — Rimon PC

(57) ABSTRACT

A data processing method is provided. The method is implemented in a distributed storage system including at least two storage disk clusters. The at least two storage disk clusters are configured with at least two energy saving states. The method includes: receiving, by a processing module of the distributed storage system, a read request including an identifier of to-be-processed data; reading metadata of the to-be-processed data based on the identifier of the to-be-processed data, to determine a first storage disk cluster and a second storage disk cluster, where the first storage disk cluster and the second storage disk cluster are configured with different energy saving states; and reading first sub-data from the first storage disk cluster, and after the first sub-data is read, reading second sub-data from the second storage disk cluster.

10 Claims, 8 Drawing Sheets

(51) Int. Cl.
*G06F 1/3234* (2019.01)
*G06F 1/3287* (2019.01)

(52) U.S. Cl.
CPC ............ *G06F 1/3287* (2013.01); *G06F 3/067* (2013.01); *G06F 3/0625* (2013.01); *G06F 3/0683* (2013.01)

(56) References Cited

U.S. PATENT DOCUMENTS

| | | |
|---|---|---|
| 9,081,687 B2 | 7/2015 | Offen et al. |
| 2015/0112951 A1 | 4/2015 | Narayanamurthy et al. |
| 2015/0177817 A1* | 6/2015 | Badri .................. G06F 1/3231 713/320 |

FOREIGN PATENT DOCUMENTS

| | | |
|---|---|---|
| CN | 104573119 A | 4/2015 |
| CN | 105138416 A | 12/2015 |
| CN | 105701028 A | 6/2016 |
| CN | 105892947 A | 8/2016 |
| CN | 106156331 A | 11/2016 |
| CN | 106777342 A | 5/2017 |
| CN | 107632784 A | 1/2018 |

OTHER PUBLICATIONS

Tom Bostoen et al.,"Power-Reduction Techniques for Data-Center Storage Systems",ACM Computing Surveys, vol. 45, No. 3, Article 33, Publication date: Jun. 2013, total 38 pages.

\* cited by examiner

DATA PROCESSING METHOD AND DISTRIBUTED STORAGE SYSTEM

CROSS-REFERENCE TO RELATED APPLICATIONS

This application is a continuation of International Application No. PCT/CN2019/105703, filed on Sep. 12, 2019, which claims priority to Chinese Patent Application No. 201811260310.1, filed on Oct. 26, 2018, the disclosure of both applications hereby being incorporated by reference in its entirety.

TECHNICAL FIELD

This application relates to the field of storage technologies, and in particular, to a data processing method and a distributed storage system.

BACKGROUND

Generally, data in a cloud storage system may be classified, according to access frequency and latency requirements, into hot data (which may also be referred to as active/temporary data), warm data (which may also be referred to as data of infrequent access storage/inactive data), and cold data (which may also be referred to as backup/archive data). The hot data is data that can be accessed at any time and whose access latency is at a millisecond (ms) level. The warm data is data that is accessed at low frequency (for example, accessed once per month on average) and whose access latency is at the millisecond level. The cold data is data that is accessed at very low frequency (for example, accessed once per year on average) and whose access latency is at a minute level.

Currently, a storage disk storing warm data is basically in a readable state. Because warm data is accessed at low frequency, an input/output (I/O) function of the storage disk storing warm data is idle for most of the time. As a result, power consumption of the storage disk is unnecessarily high. Because the latency of warm data is at the millisecond level, the storage disk storing warm data cannot be powered off or set to a dormant state. If powered off or set to the dormant state, the storage disk first needs to be powered on or woken up before data can be read. However, the power-on or wakeup process usually takes 30 to 50 seconds, and this cannot meet the latency requirement of warm data.

SUMMARY

This application provides a data processing method and a distributed storage system, to resolve a problem that the requirements of low power consumption of a storage disk and low data latency cannot be met at the same time.

To achieve the foregoing objectives, the following technical solutions are used in this application.

According to a first aspect, a data processing method is provided. The data processing method is applied to a distributed storage system that includes at least one processing node and at least two storage nodes. Storage disks of the at least two storage nodes include at least two storage disk clusters. The at least two storage disk clusters are configured with at least two energy saving states, and a processing module is deployed on the at least one processing node. The data processing method includes: after receiving a read request including an identifier of to-be-processed data, reading, by the processing module, metadata of the to-be-processed data based on the identifier of the to-be-processed data, to determine a first storage disk cluster and a second storage disk cluster, where the first storage disk cluster is configured with a first energy saving state, the second storage disk cluster is configured with a second energy saving state, and a wakeup latency of the first energy saving state is shorter than a wakeup latency of the second energy saving state; and reading, by the processing module, first sub-data of the to-be-processed data from the first storage disk cluster, and after the first sub-data is read, reading second sub-data of the to-be-processed data from the second storage disk cluster.

Power consumption of a storage disk in the energy saving state is low. Therefore, the power consumption of the storage disk is effectively reduced in a manner of storing different sub-data of the to-be-processed data in storage disk clusters in different energy saving states. When the to-be-processed data needs to be read, each piece of sub-data is sequentially read based on an access sequence. Because wakeup latencies of the storage disks in different energy saving states are different, the storage disk clusters storing the sub-data may be determined based on the access sequence and in ascending order of the wakeup latencies. Therefore, when a piece of sub-data needs to be read, the wakeup latency of a storage disk storing the sub-data basically does not delay accessing the data, and this effectively ensures that the latency requirement of each piece of sub-data is met.

In this application, "at least two storage disk clusters are configured with at least two energy saving states" may mean that energy saving states configured for any two storage disk clusters are different, or may mean that energy saving states configured for some of the at least two storage disk clusters are the same, and an energy saving state configured for another storage disk cluster is different from the energy saving states of some of storage disk clusters.

Optionally, in a possible implementation of this application, before reading the first sub-data from the first storage disk cluster, the processing module further determines, based on the metadata of the to-be-processed data, a first storage disk group in the first storage disk cluster and a second storage disk group in the second storage disk cluster. A storage disk included in the first storage disk group is a storage disk that is in the first storage disk cluster and that stores the first sub-data, and a storage disk included in the second storage disk group is a storage disk that is in the second storage disk cluster and that stores the second sub-data. Correspondingly, a method for the "reading, by the processing module, first sub-data from the first storage disk cluster" is: reading, by the processing module, the first sub-data from the first storage disk group. A method for the "reading, by the processing module, second sub-data from the second storage disk cluster" is: reading, by the processing module, the second sub-data from the second storage disk group.

A storage disk cluster includes a plurality of storage disks. Some storage disks (for example, the storage disks included in the first storage disk group) in the first storage disk cluster are used to store the first sub-data, and some storage disks (for example, the storage disks included in the second storage disk group) in the second storage disk cluster are used to store the second sub-data.

Optionally, in another possible implementation of this application, after the first storage disk group in the first storage disk cluster and the second storage disk group in the second storage disk cluster are determined, the processing module further determines that the storage disk in the first storage disk group and the storage disk in the second storage disk group are woken up.

Herein, that the storage disk is woken up may mean that the storage disk is in a readable state, or may mean that the storage disk is in a process of converting from the energy saving state to the readable state. Usually, the processing module can read the first sub-data from the first storage disk group only when the storage disk in the first storage disk group is in the readable state. Therefore, before reading the first sub-data, the processing module needs to determine that the storage disk in the first storage disk group is woken up. Similarly, the processing module can read the second sub-data from the second storage disk group only when the storage disk in the second storage disk group is in the readable state. Therefore, before reading the second sub-data, the processing module needs to determine that the storage disk in the second storage disk group is woken up.

Optionally, in another possible implementation of this application, after reading the first sub-data from the first storage disk group, the processing module further sets the storage disk in the first storage disk group to the first energy saving state. Correspondingly, after reading the second sub-data from the second storage disk group, the processing module further sets the storage disk in the second storage disk group to the second energy saving state. In some embodiments, the first energy saving state has a shorter wakeup latency than the second energy saving state.

When the processing module reads the first sub-data, the storage disk in the first storage disk group is in the readable state. After the first sub-data is read, the processing module sets the storage disk in the first storage disk group to the first energy saving state. This effectively reduces power consumption of the storage disk in the first storage disk group. Similarly, when the processing module reads the second sub-data, the storage disk in the second storage disk group is in the readable state. After the second sub-data is read, the processing module sets the storage disk in the second storage disk group to the second energy saving state. This effectively reduces power consumption of the storage disk in the second storage disk group.

Optionally, in another possible implementation of this application, before receiving the read request including the identifier of the to-be-processed data, the processing module further receives a write request including the to-be-processed data, splits the to-be-processed data into the first sub-data and the second sub-data, stores the first sub-data in the first storage disk cluster, and stores the second sub-data in the second storage disk cluster. Herein, an access sequence of the first sub-data is before an access sequence of the second sub-data.

The processing module determines, based on the access sequence and a wakeup latency of the storage disk cluster, a storage disk in which each piece of sub-data is stored. Usually, first accessed sub-data is stored in a storage disk cluster with a comparatively short wakeup latency, and later accessed sub-data is stored in a storage disk cluster with a comparatively long wakeup latency. In this way, when a piece of sub-data of the to-be-processed data starts to be read subsequently, a wakeup latency of a storage disk storing the sub-data basically has already ended or is about to end. In some embodiments, the length of the first sub data and the length of the second sub data are so determined to ensure that the wakeup latency of the second sub-data has passed before the read operation of the first sub-data is finished.

Optionally, in another possible implementation of this application, a method for that "the processing module splits the to-be-processed data into the first sub-data" is: calculating, by the processing module, a size of the first sub-data based on the wakeup latency of the first energy saving state, and the wakeup latency and access bandwidth of the second energy saving state, and determining the first sub-data, wherein both the wakeup latency of the first energy saving state and the wakeup latency of the second energy saving state are preset; and calculating, by the processing module, a size of the second sub-data based on a size of the to-be-processed data and the size of the first sub-data, and determining the second sub-data.

Optionally, in another possible implementation of this application, a method for that "the processing module stores the first sub-data in the first storage disk cluster, and stores the second sub-data in the second storage disk cluster" is: storing, by the processing module, the first sub-data in the first storage disk group, and storing the second sub-data in the second storage disk group. In addition, when remaining storage space of the storage disk in the first storage disk group is zero, the processing module sets the storage disk in the first storage disk group to the first energy saving state. When remaining storage space of the storage disk in the second storage disk group is zero, the processing module sets the storage disk in the second storage disk group to the second energy saving state.

In an actual application, to ensure data reliability, the processing module may write the sub-data into the storage disk group in an erasure coding (EC) strip storage manner or a multi-copy storage manner. When the remaining storage space of the storage disk in the storage disk group is zero, the storage disk in the storage disk group is set to the energy saving state, so that the power consumption of the storage disk is effectively reduced.

According to a second aspect, a distributed storage system is provided. The distributed storage system includes at least one processing node and at least two storage nodes, and storage disks of the at least two storage nodes include at least two storage disk clusters. The at least two storage disk clusters are configured with at least two energy saving states. A processing module is deployed on the at least one processing node, and is configured to perform the data processing method according to any one of the first aspect and the possible implementations of the first aspect.

According to a third aspect, a distributed storage system is provided. The distributed storage system includes at least two storage nodes, and storage disks of the at least two storage nodes include at least two storage disk clusters. A first storage disk cluster is in a first energy saving state, a second storage disk cluster is in a second energy saving state, and a wakeup latency of the first energy saving state is shorter than a wakeup latency of the second energy saving state. The at least two storage disk clusters are configured to store to-be-processed data. The to-be-processed data includes first sub-data and second sub-data. The first storage disk cluster stores the first sub-data, and the second storage disk cluster stores the second sub-data.

Optionally, in a possible implementation of this application, the distributed storage system further includes at least one processing node, and the at least one processing node stores metadata of the to-be-processed data. The metadata of the to-be-processed data records a correspondence between the first storage disk cluster and the first sub-data, and a correspondence between the second storage disk cluster and the second sub-data.

According to a fourth aspect, a distributed storage system is provided. The distributed storage system includes at least one processing node, and the at least one processing node includes at least one processor and at least one memory. The at least one memory is configured to store a computer instruction, and when the at least one processor invokes the computer instruction, the data processing method according to any one of the first aspect and the possible implementations of the first aspect is performed.

Optionally, in a possible implementation of this application, the at least one processor and the at least one memory are deployed on a same processing node.

Optionally, in another possible implementation of this application, the at least one processing node in this application includes a first processor and a second processor. The first processor and the second processor may be located on a same processing node, or may be deployed on different processing nodes. Optionally, the first processor is configured to receive a read request including an identifier of to-be-processed data. The second processor is configured to: in response to the read request received by the first processor, read first sub-data from a first storage disk cluster, and after the first sub-data is read, read second sub-data from a second storage disk cluster.

According to a fifth aspect, a computer-readable storage medium is provided. The computer-readable storage medium may be non-transitory or transitory, and stores an instruction, and when the instruction runs on a computer, the data processing method according to any one of the first aspect and the possible implementations of the first aspect is performed.

According to a sixth aspect, a computer program product including an instruction is provided. The computer program product includes a computer instruction, and when the computer instruction runs on a computer, the data processing method according to any one of the first aspect and the possible implementations of the first aspect is performed.

It may be understood that the distributed storage system, the computer storage medium, the computer program product, or the like provided above is configured to perform the corresponding data processing method provided above. Therefore, for beneficial effects that can be achieved by the distributed storage system, the computer storage medium, the computer program product, or the like, refer to beneficial effects in the corresponding method. Details are not described herein.

In this application, a name of the foregoing processing module does not constitute any limitation to function modules. In an actual implementation, these function modules may have other names. The functional modules similar to those in this application shall fall within the scope of the claims in this application and equivalent technologies thereof.

These aspects or other aspects in this application are more concise and comprehensible in the following description.

DESCRIPTION OF EMBODIMENTS

Figure 1:
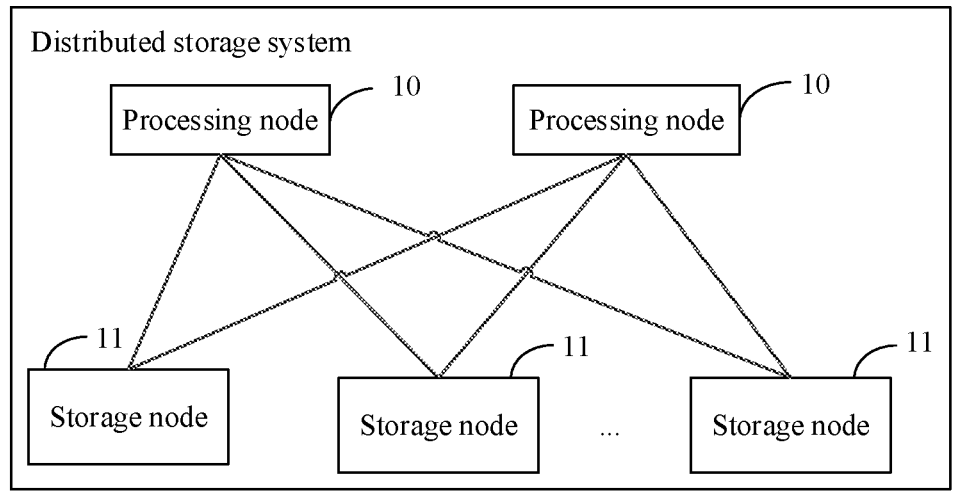
FIG. 1 is a schematic structural diagram 1 of a distributed storage system according to an embodiment of this application.

For ease of understanding this application, related elements in this application are first explained.

Storage Disk:

A storage disk is a storage medium of a storage node. For the storage node, refer to the following descriptions of FIG. 1, FIG. 6, and FIG. 7.

Optionally, the storage disk in this application may be a serial advanced technology attachment (SATA) hard disk, a serial attached SCSI (SAS) hard disk, a removable hard disk, a universal serial bus (USB) hard disk, or the like, or may be a hard disk drive (HDD) or a solid-state drive (SSD), or may be another storage medium. This is not specifically limited in this application.

Generally, a storage disk may be in a readable state and an energy saving state. Power consumption of the storage disk in the energy saving state is less than power consumption of the storage disk in the readable state.

Readable State of a Storage Disk:

A storage disk in a readable state supports immediate read. In other words, a wakeup latency of the storage disk is very short, and the storage disk is close to having no wakeup latency. If a storage disk is always in a readable state, the power consumption of the storage disk is 5.4 W. In the embodiments of this application, the storage disk in a readable state is referred to as an idle state 0 (Idle_0) storage disk.

Energy Saving State of a Storage Disk:

Currently, all storage disks provided by various storage disk vendors support a plurality of energy saving states. Each energy saving state corresponds to one level of power consumption of a storage disk and a wakeup latency. The wakeup latency is a latency at which the storage disk switches from the energy saving state to a readable state. Different energy saving states corresponds to different power consumption of the storage disk. Similarly, different energy saving states corresponds to different wakeup latencies.

For example, Table 1 shows power consumption and wakeup latencies of a specific storage disk in different energy saving states.

TABLE 1

| Energy saving states | Power consumption (W) | wakeup latencies | |
|---|---|---|---|
| Idle state A (Idle_A) | 5.3 | 10 milliseconds | A-state for short |
| Idle state B (Idle_B) | 3.4 | 1.5 seconds | B-state for short |

TABLE 1-continued

| Energy saving states | Power consumption (W) | wakeup latencies | |
|---|---|---|---|
| Idle state C (Idle_C)/Standby state Y (Standby_Y) | 2.8 | 4 seconds | C-state for short |
| Sleep state (Sleep)/Standby state Z (Standby_Z) | 0.7 | 15 seconds | Z-state for short |

Data of a Cloud Storage System:

Data in a cloud storage system includes hot data, warm data, and cold data.

Hot data can be accessed at any time and whose access latency is at a millisecond level. Therefore, a storage disk storing the hot data is basically in a readable state.

Cold data is accessed at very low frequency (for example, accessed once per year on average) and whose latency is at a minute level. Therefore, a storage disk storing the cold data may be powered off or set to a dormant state, to reduce power consumption of the storage disk. Subsequently, when the cold data needs to be read, the storage disk is powered on or set to the readable state.

Warm data is accessed at low frequency (for example, accessed once per month on average) and whose latency is at the millisecond level.

The data related in this application may be an object, a block, or a file. This is not specifically limited in this application.

In the specification, claims, and accompanying drawings of the embodiments of this application, the terms "first", "second", "third", "fourth" and the like are intended to distinguish between different objects but do not indicate a particular order.

In the embodiments of this application, the word "for example" is used to represent giving an example, an illustration, or a description. Any embodiment or design scheme described as an "exemplary" or "for example" in the embodiments of this application should not be explained as having more advantages than another embodiment or design scheme. Exactly, use of the word "exemplary" or "example" or the like is intended to present a relative concept in a specific manner.

Currently, a storage disk storing warm data is basically in a readable state. Because the warm data is accessed at low frequency, an I/O function of a storage disk storing the warm data is idle for most of the time. In other words, the storage disk storing the warm data is idling for most of the time, and power consumption of the storage disk is high. Because a latency of the warm data is at a millisecond level, the storage disk storing the warm data cannot be powered off or set to a dormant state. If powered off or set to the dormant state, the storage disk first needs to be powered on or woken up before the warm data can be read. However, the power-on or wakeup process usually takes 30 to 50 seconds, and this cannot meet the latency requirement of warm data. In other words, currently, a method that can not only meet the latency requirement of warm data, but also reduce the power consumption of the storage disk cannot be provided.

Therefore, this application provides a data processing method and a distributed storage system. Specifically, storage disks of the distributed storage system include at least two storage disk clusters, and the at least two storage disk clusters are configured with at least two energy saving states. Different sub-data of a piece of data is stored in different storage disk clusters of the distributed storage system that are in different energy saving states. The power consumption of a storage disk in an energy saving state is comparatively low. Therefore, the power consumption of the storage disk is effectively reduced by storing different sub-data of the data in the storage disk clusters in different energy saving states. When the data needs to be read, each piece of sub-data is sequentially read based on an access sequence. Because the wakeup latencies of the storage disks in different energy saving states are different, the storage disk clusters storing the sub-data may be determined based on the access sequence and in ascending order of the wakeup latencies. Therefore, when a piece of sub-data needs to be read and the wakeup latency of the storage disk storing the sub-data basically ends, this effectively ensures that the latency requirement of each piece of sub-data is met.

Optionally, in this application, if in the access sequence, a piece of sub-data is earlier, a wakeup latency of a storage disk cluster storing the sub-data is shorter. If in the access sequence, a piece of sub-data is later, a wakeup latency of a storage disk cluster storing the sub-data is longer. When a piece of data is read, all storage disks storing sub-data of the data may be woken up. In this way, for a piece of sub-data, when it is the time to read the sub-data, the wakeup latency of the storage disk storing the sub-data has run out or is about to run out. This ensure that the latency requirement of the data is met, and the power consumption of the storage disk is also reduced.

For example, the distributed storage system provided in the embodiments of this application includes at least two storage disk clusters. First sub-data of to-be-processed data is stored in a first storage disk cluster, second sub-data of the to-be-processed data is stored in a second storage disk cluster, and an energy saving state configured for the first storage disk cluster is different from an energy saving state configured for the second storage disk cluster. In this way, when the to-be-processed data needs to be read, the first sub-data is read from the first storage disk cluster, and after the first sub-data is read, the second sub-data is read from the second storage disk cluster.

A data processing method provided in the embodiments of this application is applicable to a distributed storage system. FIG. 1 is a schematic structural diagram of the distributed storage system. As shown in FIG. 1, the distributed storage system may include at least one processing node 10 and at least two storage nodes 11, and the processing node 10 may communicate with each storage node 11. If the distributed storage system includes a plurality of processing nodes 10, different processing nodes 10 may also communicate with each other. It may be understood that the distributed storage system shown in FIG. 1 is merely an example. In an actual application, a plurality of storage nodes 11 may directly communicate with each other, or communicate with each other through another device. This is not limited in the embodiments of this application.

The processing node 10 is a device that provides an I/O processing capability in the distributed storage system.

The processing node 10 may be configured to: split, based on a write request, to-be-written data into a plurality of pieces of sub-data, and store each piece of sub-data in a corresponding storage disk; or may be configured to: after receiving a read request, sequentially read each piece of sub-data. Alternatively, the processing node 10 may be configured to: after storing the sub-data in the storage disk, store a correspondence between the sub-data and the storage disk, in other words, metadata of the sub-data is stored. The processing node 10 may further monitor and manage states of storage disks of the at least two storage nodes 11.

Figure 2A:
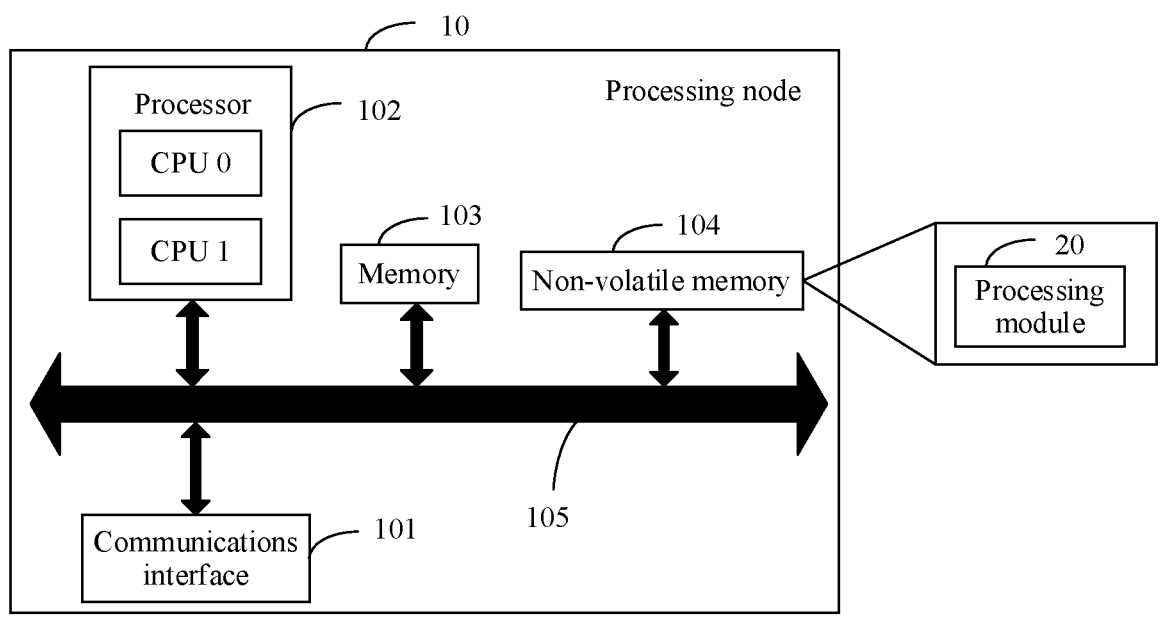
FIG. 2A is a schematic structural diagram 1 of a processing node according to an embodiment of this application.

Optionally, with reference to FIG. 1, as shown in FIG. 2A, the processing node 10 includes a communications interface 101, a processor 102, a memory 103, and a non-volatile memory 104. The communications interface 101, the processor 102, the memory 103, and the non-volatile memory 104 are connected through a system bus 105.

The communications interface 101 is configured to communicate with another device (for example, the storage node 11).

The processor 102 is configured to complete a function of the processing node 10. The processor 102 may be any computing device, and may be a general-purpose central processing unit (CPU), a microprocessor, a programmable controller, an application-specific integrated circuit (ASIC), or one or more integrated circuits used for controlling program execution in the solutions of this application. The processor 102 is a control center of the processing node 10.

In a specific implementation, in an embodiment, the processor 102 may include one or more CPUs. For example, the processor in FIG. 2A includes a CPU 0 and a CPU 1.

The processor 102 may further include a cache (not shown in FIG. 2A). The cache is configured to store various program instructions.

The memory 103 is configured to cache data received from a peripheral or data read from the non-volatile memory 104. The memory 103 may be various non-transitory machine-readable media that can store data such as a read-only memory (ROM) or a flash memory. This is not limited herein.

Optionally, the cache and the memory 103 in the processor 102 may be integrated or independently disposed. This is not limited in the embodiments of this application.

The non-volatile memory 104 may be configured to store a software program and an application module, for example, a system program of the processing node 10, an application module for splitting the to-be-written data, and the like. By running the software program or the application module, the processor 102 executes various functional applications and data processing of the processing node 10.

The non-volatile memory 104 may be a read-only memory (ROM), a static random access memory (SRAM), a flash memory, an HDD, an SSD, a disk storage medium, or another magnetic storage device, or any other medium that can be used to carry or store expected program code in a form of an instruction or a data structure and that can be accessed by a network device, however, this is not limited thereto.

Optionally, with reference to the processing node shown in FIG. 2A, the processing node provided in this embodiment of this application may further include at least two storage disks configured to store data. The at least two storage disks herein may be directly connected to another component on the processing node through the system bus (the processing node of the structure is shown in FIG. 2B), or may be connected, through an adapter card (the adapter card is connected to another component through the system bus), to a storage disk included in a storage apparatus to which another component on the processing node is connected (the processing node of the structure is shown in FIG. 2C).

Figure 2B:
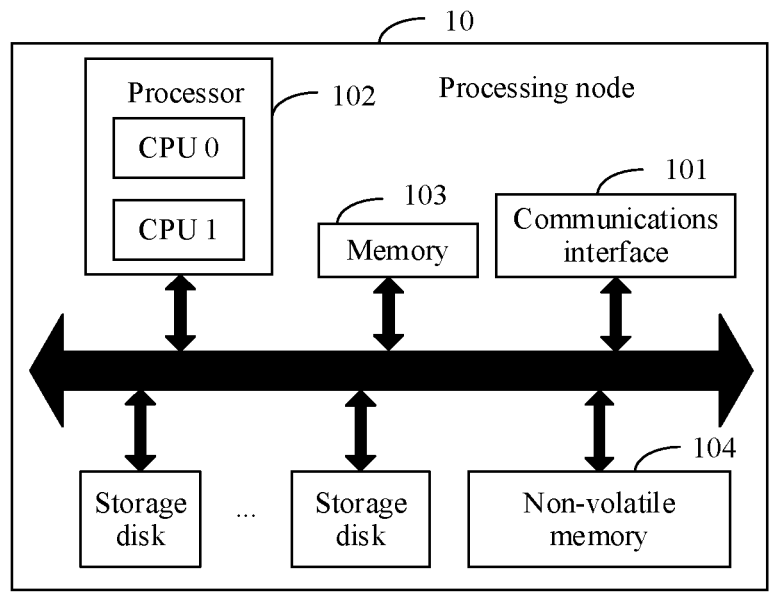
FIG. 2B is a schematic structural diagram 2 of a processing node according to an embodiment of this application.
Figure 2C:
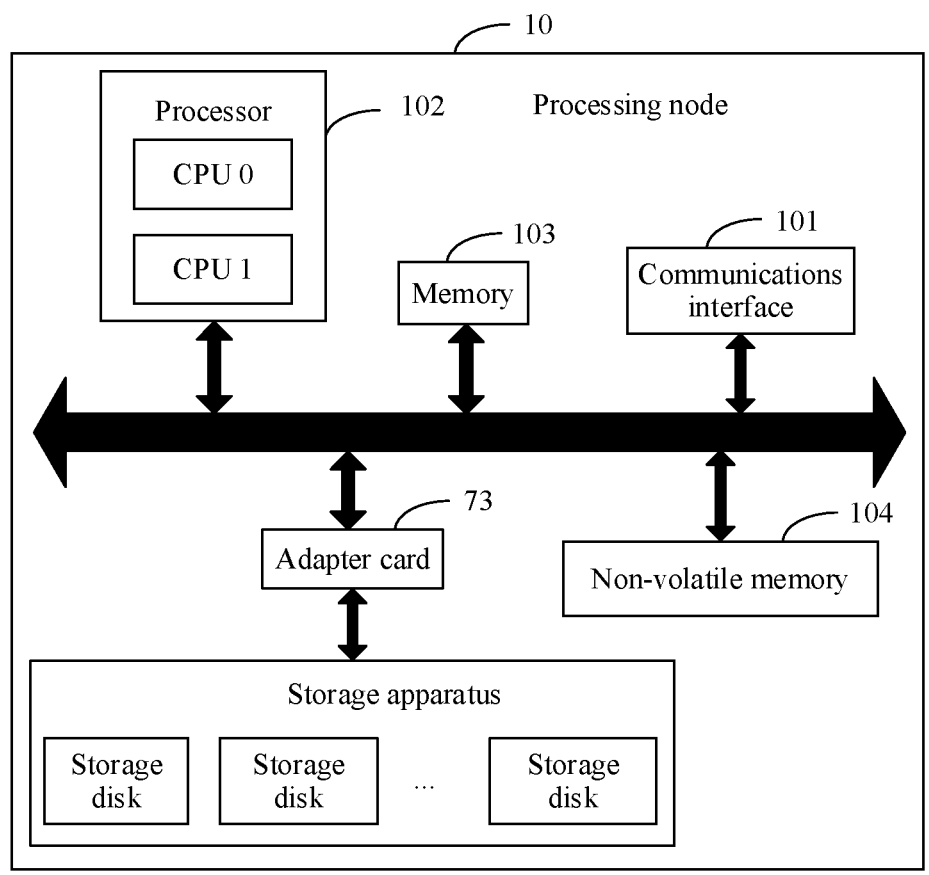
FIG. 2C is a schematic structural diagram 3 of a processing node according to an embodiment of this application.

The processing node shown in FIG. 2B may exist in a form of a server, and the processing node shown in FIG. 2C may exist in a form of a server connected to the storage apparatus. Because the processing nodes shown in FIG. 2B and FIG. 2C each include at least two storage disks, the processing nodes shown in FIG. 2B and FIG. 2C may both be special storage nodes. In an actual application, the storage apparatus shown in FIG. 2C further includes a storage controller configured to manage the at least two storage disks, and the storage controller is not shown in FIG. 2C.

A processing module 20 is deployed on the at least one processing node 10 in this embodiment of this application. The processing module 20 may be a software module such as a process or a thread.

The processing module 20 may complete the function of the processing node 10. In other words, the processing module 20 may be configured to: receive the read request, and read corresponding data from the at least two storage nodes 11 in response to the read request. Alternatively or additionally, the processing module 20 may be configured to: receive the write request, split the to-be-written data into the plurality of pieces of sub-data in response to the write request, and store each piece of sub-data in the corresponding storage disk. After storing the sub-data, the processing module 20 stores the correspondence between the sub-data and the storage disk, in other words, the metadata of the sub-data is stored. The processing module 20 may further monitor and manage the states of the storage disks of the at least two storage nodes 11.

For example, the processing module 20 is configured to: receive the write request including to-be-processed data, and split the to-be-processed data into first sub-data and second sub-data. The processing module 20 is configured to: store the first sub-data in a first storage disk cluster of the at least two storage nodes 11, and store the second sub-data in a second storage disk cluster of the at least two storage nodes 11. The first storage disk cluster and the second storage disk cluster are configured with different energy saving states. For the storage disk cluster, refer to subsequent descriptions. The processing module 20 is further configured to: receive the read request including an identifier of the to-be-processed data, and read metadata of the to-be-processed data based on the identifier of the to-be-processed data, to determine the first storage disk cluster and the second storage disk cluster. The processing module 20 is further configured to: read the first sub-data from the first storage disk cluster, and after the first sub-data is read, read the second sub-data from the second storage disk cluster. Optionally, the processing module 20 further stores a correspondence between a storage disk in the first storage disk cluster and the first sub-data, and stores a correspondence between a storage disk in the second storage disk cluster and the second sub-data.

A part or all of the processing module 20 may be stored, in a form of a computer program, in a non-volatile memory of a specific processing node 10 (or a memory 103 of the specific processing node 10). FIG. 2A shows a structure of the non-volatile memory 104 that is of the processing node 10 and in which the processing module 20 is stored in the form of the computer program.

Optionally, the processing module 20 may include a service module 201 and a management module 202. The service module 201 communicates with the management module 202 and the storage node 11. The service module 201 is configured to: receive the read request, and read the corresponding data from the at least two storage nodes 11 in response to the read request. Alternatively, the service module 201 may be configured to: receive the write request, split the to-be-written data into the plurality of pieces of sub-data in response to the write request, and store each piece of sub-data in the at least two storage nodes 11. The service module 201 may further store a correspondence between sub-data and a storage disk cluster. The management module 202 is configured to monitor and manage storage disk clusters of the at least two storage nodes 11, and is further configured to manage each storage disk.

It is easy to understand that both the service module 201 and the management module 202 are submodules of the processing module 20. Both the service module 201 and the management module 202 may be software modules such as processes or threads.

In an actual application, the service module 201 may be implemented by a specific processing node 10 in the at least two processing nodes 10, may be a function module in the specific processing node 10 in the at least two processing nodes 10, or may be disposed on the plurality of processing nodes 10 in a distributed manner. Similarly, the management module 202 may be implemented by a specific processing node 10 in the at least two processing nodes 10, may be a function module in the specific processing node 10 in the at least two processing nodes 10, or may be disposed on the plurality of processing nodes 10 in the distributed manner.

Figure 3:
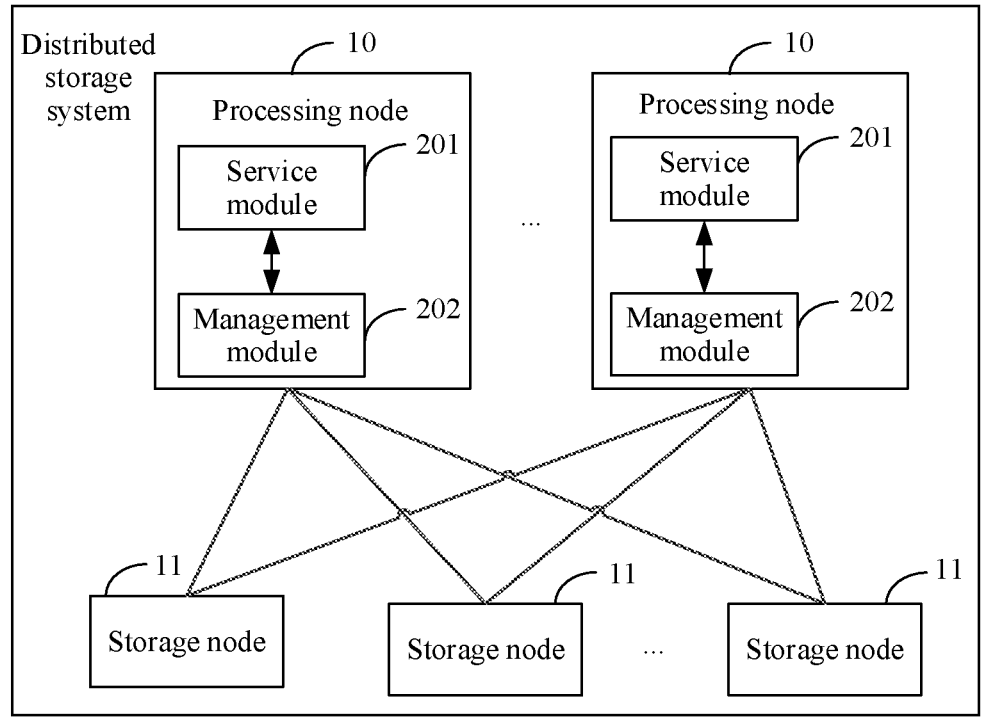
FIG. 3 is a schematic structural diagram 2 of a distributed storage system according to an embodiment of this application.
Figure 4:
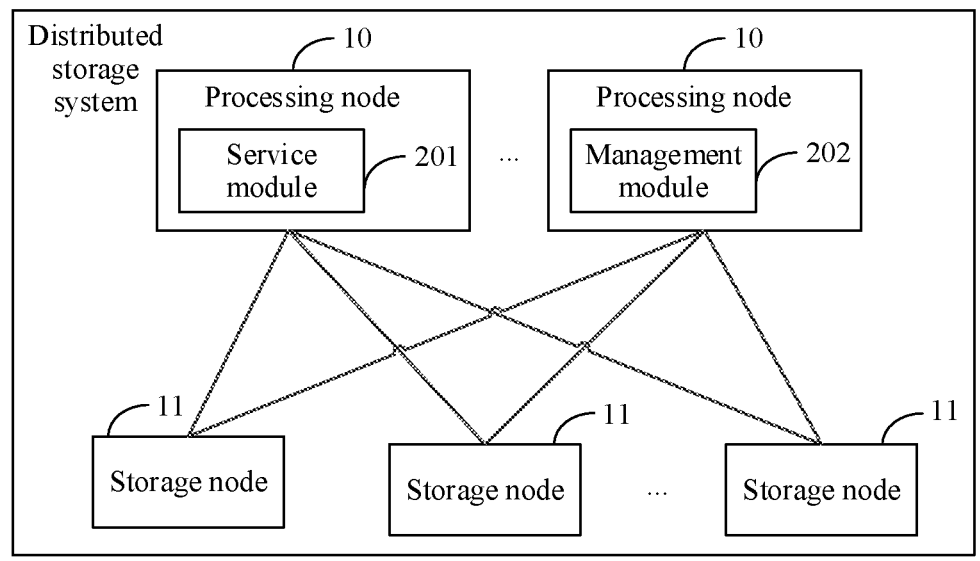
FIG. 4 is a schematic structural diagram 3 of a distributed storage system according to an embodiment of this application.

In other words, the service module 201 and the management module 202 may be located on a same processing node 10 (a schematic diagram of that the service module 201 and the management module 202 are located on the same processing node 10 is shown in FIG. 3), or may be located on different processing nodes 10 (a schematic diagram of that the service module 201 and the management module 202 are located on different processing nodes 10 is shown in FIG. 4). FIG. 3 and FIG. 4 show structures of the processing nodes 10 from a perspective of software. FIG. 3 and FIG. 4 are schematic diagrams of distribution structures of a service module 201 and a management module 202, and do not limit the distribution structures of the service module 201 and the management module 202.

It is easy to understand that the service module 201 and the management module 202 may be stored in non-volatile memories 104 (or memories 103) of the corresponding processing nodes 10 in a form of computer programs.

Certainly, in an actual application, the processing module may be further divided into another function module based on an actual function of the processing module 20, for example, a metadata module. The metadata module is configured to store the correspondence between sub-data and a storage disk cluster. This is not specifically limited in this embodiment of this application.

The storage node 11 in FIG. 1 is a device that provides storage space in the distributed storage system.

In the distributed storage system in this embodiment of this application, a storage disk pool includes the storage disks of the at least two storage nodes 11. The storage disks in the storage disk pool are divided into at least two storage disk clusters based on wakeup latencies, and the wakeup latencies of the storage disk clusters are different. For ease of description, that "the storage disks of the at least two storage nodes 11 are divided into the at least two storage disk clusters" is used for description subsequently.

In an actual application, the storage disks of the at least two storage nodes 11 are divided into the at least two storage disk clusters based on energy saving states that the storage disks may support. The at least two storage disk clusters are configured with at least two energy saving states.

A quantity of the storage disk clusters may be the same as types of the energy saving states supported by the storage disk, or may be fewer than the number of the types of the energy saving states supported by the storage disk. Energy saving states configured for any two of the at least two storage disk clusters may be different or may be the same.

Figure 5:
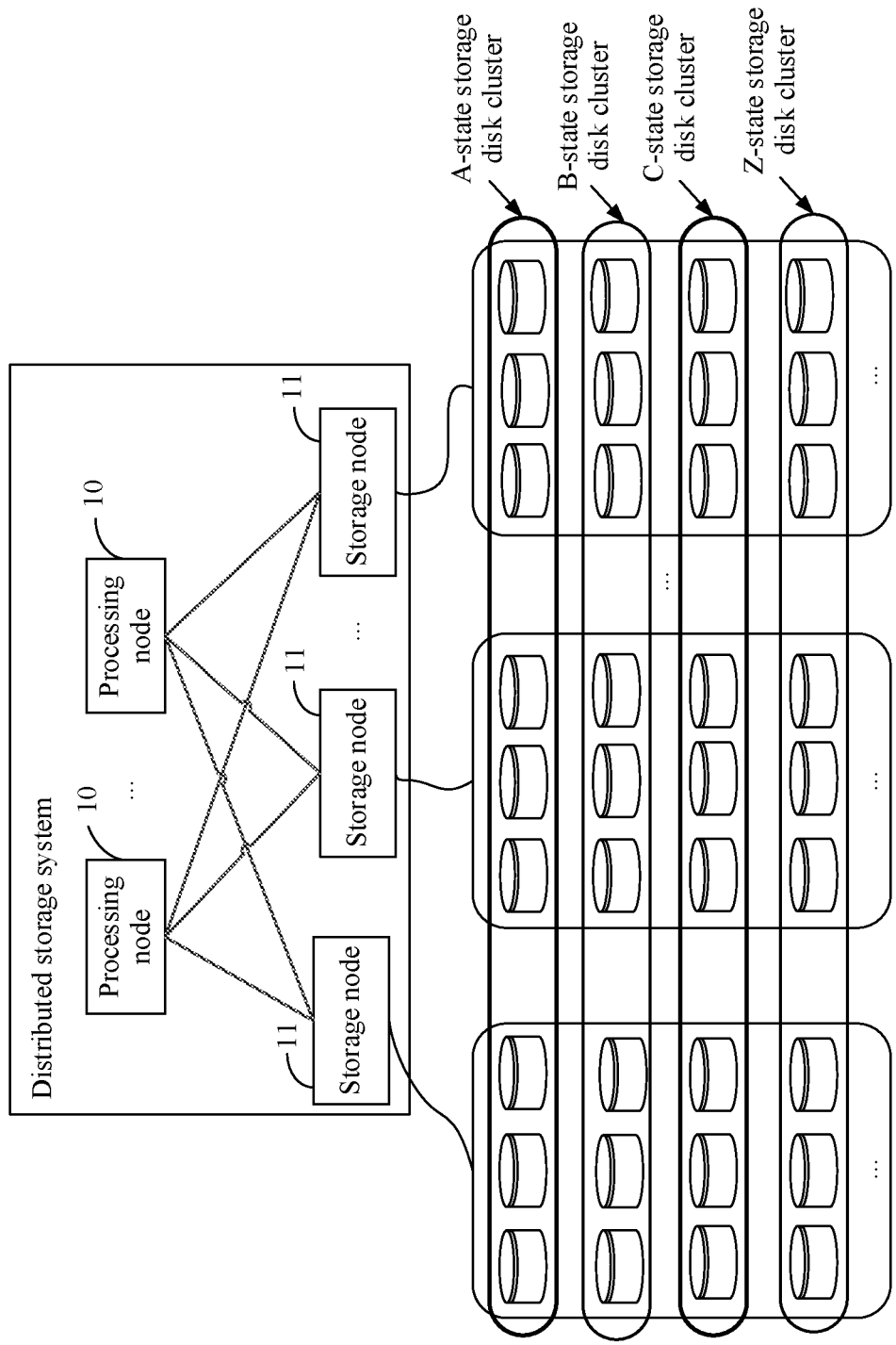
FIG. 5 is a schematic structural diagram of a storage disk cluster according to an embodiment of this application.

For example, with reference to Table 1 and FIG. 1, as shown in FIG. 5, if the storage disk supports four energy saving states (an A state, a B state, a C state, and a Z state), the storage disks of the at least two storage nodes 11 may be divided into four storage disk clusters. The four storage disk clusters are: an A-state storage disk cluster, a B-state storage disk cluster, a C-state storage disk cluster, and a Z-state storage disk cluster.

A wakeup latency of a storage disk in the A-state storage disk cluster is 10 ms, and power consumption is 5.3 W. Performance of the storage disk in the state is basically the same as that of a storage disk in an idle state 0 storage disk. A wakeup latency of a storage disk in the B-state storage disk cluster is 1.5 seconds, and power consumption is 3.4 W. Compared with the idle state 0 storage disk, the power consumption of the storage disk in the B-state storage disk cluster is reduced by 37%. A wakeup latency of a storage disk in the C-state storage disk cluster is 4 seconds, and power consumption is 2.8 W. Compared with the idle state 0 storage disk, the power consumption of the storage disk in the C-state storage disk cluster is reduced by 48%. A wakeup latency of a storage disk in the Z-state storage disk cluster is 15 seconds, and power consumption is 0.7 W. Compared with the idle state 0 storage disk, the power consumption of the storage disk in the Z-state storage disk cluster is reduced by 87%.

Certainly, based on an actual requirement, the quantity of the storage disk clusters into which the storage disks of the at least two storage nodes 11 are divided may be fewer than 4. For example, the storage disks of the at least two storage nodes 11 are divided into three storage disk clusters. The three storage disk clusters are: the A-state storage disk cluster, the B-state storage disk cluster, and the C-state storage disk cluster.

Optionally, the at least two storage disk clusters are sequentially arranged in ascending order of the wakeup latencies. It is easy to understand that, for ease of description, this embodiment of this application is mainly described by using an example in which the at least two storage disk clusters are sequentially arranged in ascending order of the wakeup latencies. In an actual application, the at least two storage disk clusters may alternatively be sequentially arranged in descending order of the wakeup latencies. This is not specifically limited in this application.

The storage disks of the at least two storage nodes include a storage disk of each storage node. In this embodiment of this application, for each storage node, the storage disk of the storage node may be a storage disk connected to a system bus of the storage node, or may be a storage disk in a peripheral connected to an adapter card. The adapter card is connected to the system bus.

Optionally, the storage node 11 may have the function of the processing node 10. In this way, the storage node 11 and the processing node 10 may be considered as a same device. In this scenario, for hardware structures of the storage nodes 11, refer to FIG. 2B or FIG. 2C.

Certainly, the storage node 11 may not have the function of the processing node 10, but has only the function of storing data. The following FIG. 6 and FIG. 7 show hardware structures of storage nodes 11 in this scenario.

Figure 6:
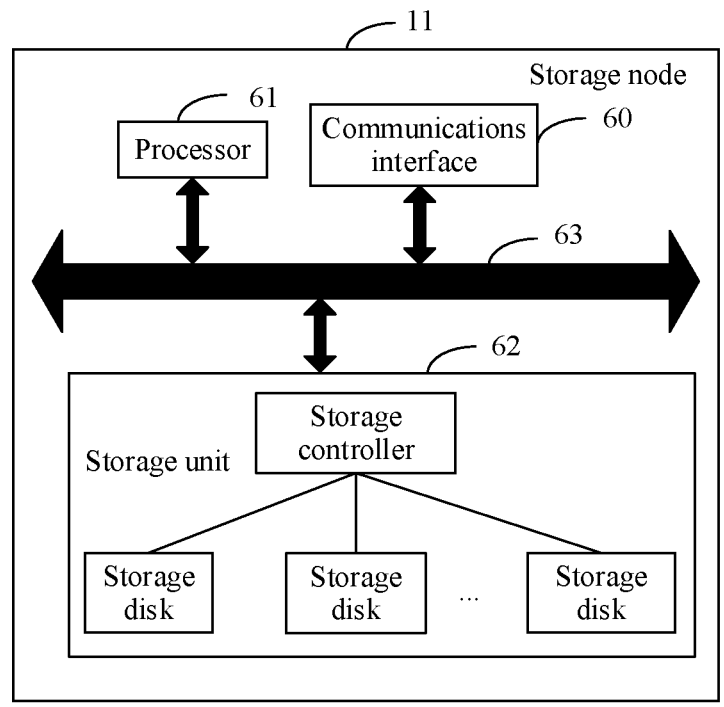
FIG. 6 is a schematic structural diagram 1 of a storage node according to an embodiment of this application.
Figure 7:
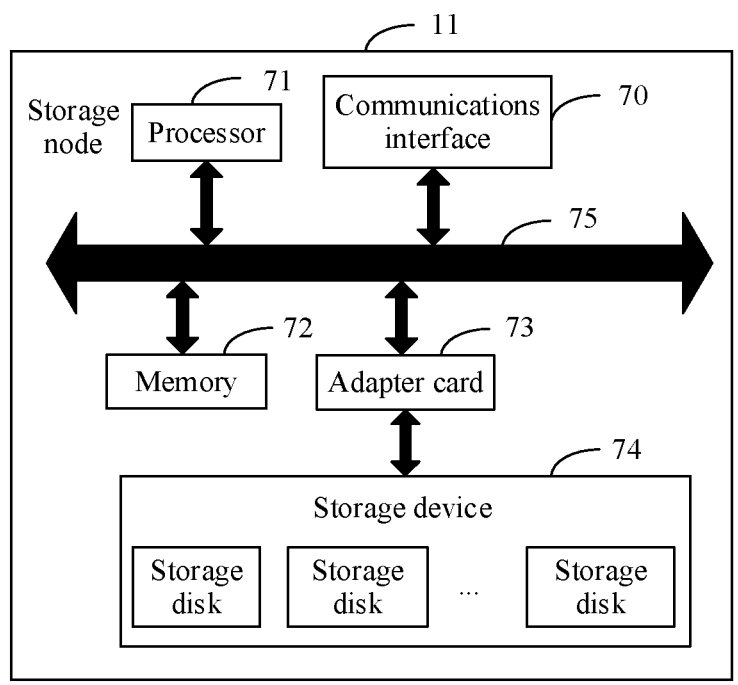
FIG. 7 is a schematic structural diagram 2 of a storage node according to an embodiment of this application.

As shown in FIG. 6, the storage node 11 includes a communications interface 60, a processor 61, and a storage unit 62. The communications interface 60, the processor 61, and the storage unit 62 are connected through a system bus 63.

The communications interface 60 is configured to communicate with another device (for example, the processing node 10).

The processor 61 is configured to implement a data storage procedure.

The processor 61 may be any computing device, and may be a CPU, a microprocessor, a programmable controller, an ASIC, or one or more integrated circuits used for controlling program execution in the solutions of this application. The processor 61 is a control center of the storage node 11.

The storage unit 62 may include at least one storage controller and a plurality of storage disks connected to each storage controller. The storage controller may be an ASIC chip, or may be a field programmable gate array (FPGA) chip. Herein, a physical form of the storage unit 62 may be an SSD or an HDD.

Optionally, the storage node 11 shown in FIG. 6 may exist in a form of a server.

As shown in FIG. 7, the storage node 11 includes a communications interface 70, a processor 71, a memory 72, an adapter card 73, and a storage device 74. The communications interface 70, the processor 71, the memory 72, and the adapter card 73 are connected through a system bus 75. The storage device 74 includes a plurality of storage disks, and the storage device 74 is connected to the adapter card 73.

The communications interface 70 is configured to communicate with another device (for example, the processing node 10).

The processor 71 is configured to implement a data storage procedure.

The processor 71 may be any computing device, and may be a CPU, a microprocessor, a programmable controller, an ASIC, or one or more integrated circuits used for controlling program execution in the solutions of this application. The processor 71 is a control center of the storage node 11.

The memory 72 may be configured to store a software program and an application module, for example, a system program of the storage node 11. The processor 71 executes various function applications of the storage node 11 by running the software program and the application module.

Optionally, a server may include the communications interface 70, the processor 71, the memory 72, and the adapter card 73 in FIG. 7, and the storage device 74 may be considered as a storage-dedicated peripheral connected to the server. Certainly, the storage device 74 further includes a storage controller that is not shown in FIG. 7.

From the software perspective, the storage node 11 shown in FIG. 6 or FIG. 7 includes a storage module, and the storage module is configured to manage data writing or data reading. The storage module may communicate with the foregoing service module 201 to implement the data writing or the data reading, or may communicate with the management module 202 to implement control on a state of a storage disk.

Generally, the distributed storage system needs to be established before a read/write operation is performed. Specifically, the at least two storage disk clusters and the like are deployed on the at least two storage nodes 11 in the distributed storage system based on a configuration file. The configuration file may be used to record the quantity of the storage disk clusters in the distributed storage system, the wakeup latencies of the storage disk clusters, and the like.

The following describes the data processing method provided in the embodiments of this application with reference to FIG. 1 to FIG. 7.

It can be learned from the foregoing descriptions that the storage disks of the distributed storage system provided in the embodiments of this application include the at least two storage disk clusters, and the at least two storage disk clusters are configured with the at least two energy saving states. Different sub-data of a piece of data is stored in storage disk clusters that are in different energy saving states. For ease of description, an example is used for description, in which the storage disks in the distributed storage system are pre-configured with the at least two storage disk clusters; the energy saving states configured for the storage disk clusters are different; and the to-be-processed data is read and written. The to-be-processed data includes the first sub-data and the second sub-data.

In addition, with reference to the foregoing descriptions, the service module and the management module are used as an example to describe the data processing method provided in the embodiments of this application.

Figure 8A:
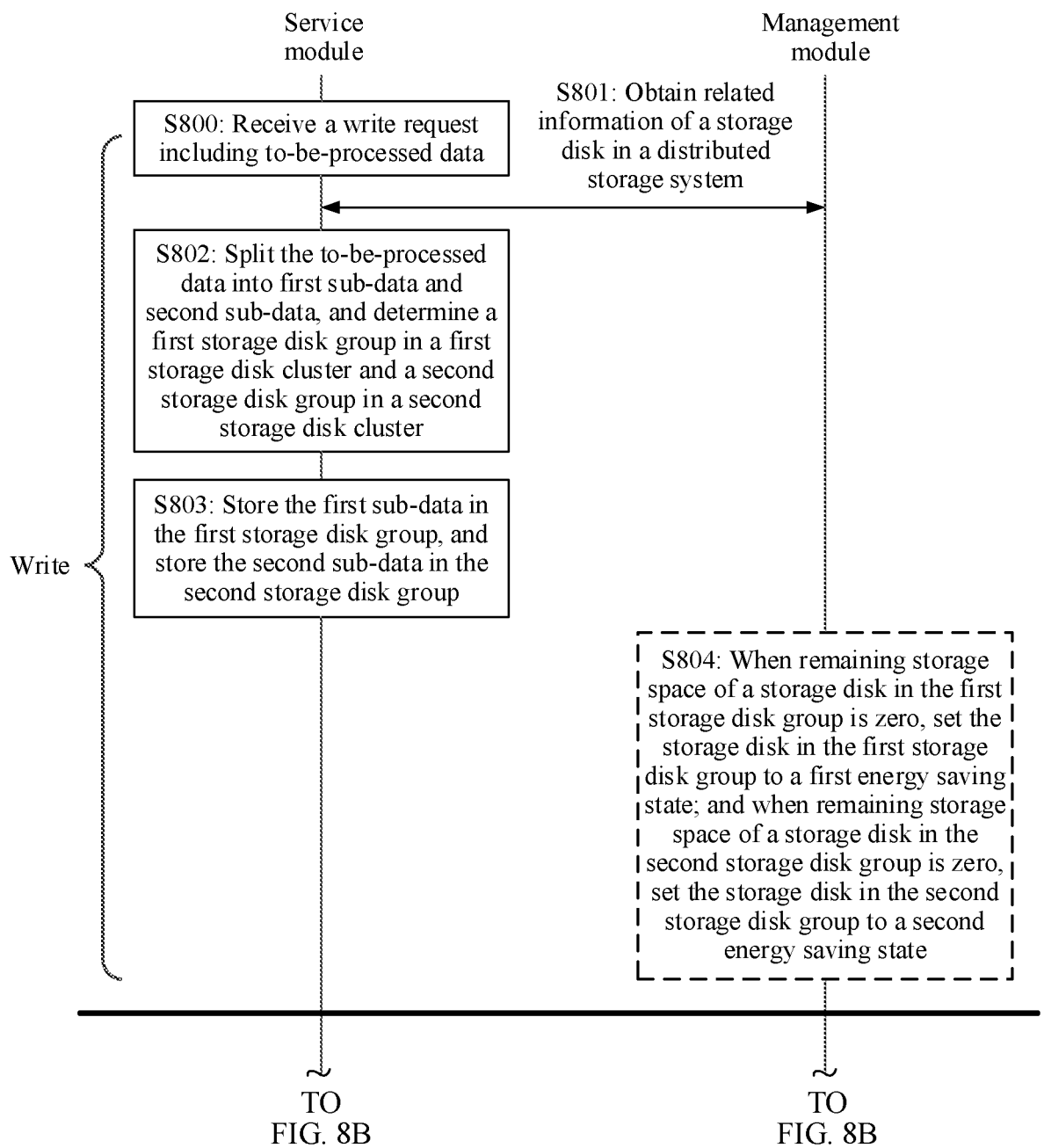
FIG. 8A and FIG. 8B are a schematic flowchart of a data processing method according to an embodiment of this application.
Figure 8B:
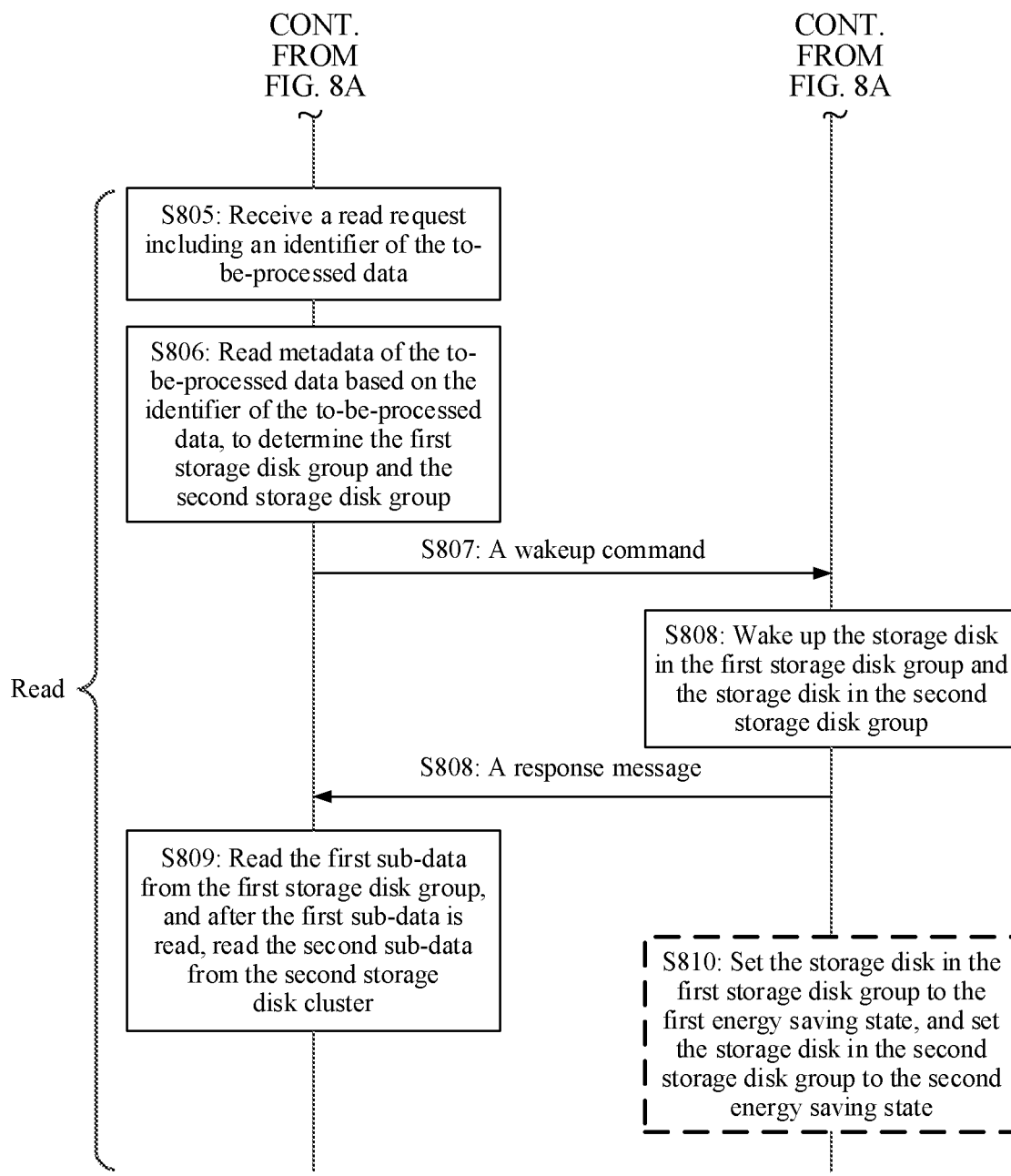

FIG. 8A and FIG. 8B are a schematic interaction diagram of a data processing method according to an embodiment of this application. The method shown in FIG. 8A and FIG. 8B may include the following steps.

S800: A service module receives a write request including to-be-processed data.

S801: The service module communicates with a management module, to obtain related information of a storage disk in a distributed storage system.

With reference to the foregoing descriptions, it can be learned that the management module is configured to monitor and manage storage disk clusters of at least two storage nodes, and is further configured to manage each storage disk. In this way, the management module can determine information about each storage disk cluster, for example, an energy saving state configured for the storage disk cluster. The management module can further determine information about each storage disk in the storage disk cluster, for example, a current state of the storage disk and a remaining storage capacity of the storage disk.

Optionally, after receiving a write request, in response to the write request, the service module sends a storage disk information obtaining request to the management module, to request information about each storage disk cluster in the distributed storage system and information about each storage disk in the storage disk cluster. Correspondingly, after receiving the storage disk information request, the management module sends, to the service module, the information about each storage disk cluster in the distributed storage system and the information about each storage disk in the storage disk cluster.

S802: The service module splits the to-be-processed data into first sub-data and second sub-data, and determines a first storage disk group in a first storage disk cluster and a second storage disk group in a second storage disk cluster.

An access sequence of the first sub-data is before an access sequence of the second sub-data.

Optionally, the service module may split, based on the access sequence and a wakeup latency of the energy saving state configured for the storage disk cluster (which is subsequently represented by the wakeup latency of the storage disk cluster), the to-be-processed data into the first sub-data and the second sub-data, or may split, based on another rule and the wakeup latency of the storage disk cluster, the to-be-processed data into the first sub-data and the second sub-data. This is not specifically limited in this embodiment of this application.

This embodiment is mainly described by using an example in which the service module splits, based on the access sequence and the wakeup latency of the storage disk cluster, the to-be-processed data into the first sub-data and the second sub-data.

Specifically, the service module communicates with the management module, and determines the energy saving state configured for each storage disk cluster in the distributed storage system. It is assumed that the first storage disk cluster is configured with a first energy saving state, the second storage disk cluster is configured with a second energy saving state, a wakeup latency of the first energy saving state is less than a wakeup latency of the second energy saving state, and that a wakeup latency of the first energy saving state is less than a wakeup latency of the second energy saving state is preset, the service module calculates a size of the first sub-data based on the wakeup latency of the first energy saving state, and the wakeup latency and access bandwidth of the second energy saving state, and determines the first sub-data. Correspondingly, the service module calculates a size of the second sub-data based on a size of the to-be-processed data and the size of the first sub-data, and determines the second sub-data.

Optionally, the access bandwidth may be I/O bandwidth between a client and a storage disk, preset fixed-size bandwidth, or I/O bandwidth in a specific application scenario. This is not specifically limited in the embodiments of this application.

For example, with reference to Table 1, if the access bandwidth is the I/O bandwidth between the client and the storage disk, the bandwidth is represented by T. The wakeup latency of the first energy saving state is represented by DA, and the wakeup latency of the second energy saving state is represented by DB. The service module splits the to-be-processed data into the first sub-data and the second sub-data. In this case, a size L1 of the first sub-data is: L1=T×(DB−DA+λ1), and a size L2 of the second sub-data is: L2=the size of the to-be-processed data−L1. λ1 is a time adjustment factor, and is used to adjust a period of time in an actual running process, to ensure continuity of a sequence of reading and writing of multi-level storage. Therefore, the multi-level storage does not wait or overlap in terms of time, and λ1 is also used to adapt to a processing latency (at a millisecond level) of the service module. A value of the time adjustment factor needs to be determined based on an actual situation, and may be zero or another value.

After determining the first sub-data and the first storage disk cluster based on the access sequence and in ascending order of the wakeup latencies, the service module determines the first storage disk group based on the state and the remaining storage space of each storage disk in the first storage disk cluster. The first storage disk group includes a plurality of storage disks that are in a readable state and whose remaining storage space is greater than zero, where the plurality of storage disks are in the first storage disk cluster. Correspondingly, after determining the second sub-data and the second storage disk cluster, the service module determines the second storage disk group based on the state and the remaining storage space of each storage disk in the second storage disk cluster. The second storage disk group includes a plurality of storage disks that are in the readable state and whose remaining storage space is greater than zero.

It should be noted that, in an actual application, for the storage disk cluster in the distributed storage system, the storage disk cluster is set to always have a plurality of storage disks in the readable state (but not all storage disks, usually a few storage disks in the storage disk cluster), and remaining storage disks are set to a corresponding energy saving state, to meet read and write timeliness. Optionally, for a specific storage disk cluster, if remaining storage space of x storage disks that are currently in the readable state is less than a preset value, states of other x storage disks in the storage disk cluster are switched from the energy saving state to the readable state.

Correspondingly, the first storage disk group includes the storage disk that is currently in the readable state and that is in the first storage disk cluster, and the second storage disk group includes a storage disk that is currently in the readable state and that is in the second storage disk cluster.

S803: The service module stores the first sub-data in the first storage disk group, and stores the second sub-data in the second storage disk group.

Optionally, to ensure data reliability, the service module may write the sub-data into the storage disk group in an erasure coding (EC) strip storage manner or a multi-copy storage manner. This is not specifically limited in the embodiments of this application. For the EC strip storage manner and the multi-copy storage manner, refer to a prior art. Details are not described herein.

Specifically, the service module determines a storage node to which each storage disk in the first storage disk group belongs, and sends a sub-data write request to the determined storage node, so that the determined storage node stores the first sub-data in a corresponding storage disk. Similarly, the service module determines a storage node to which each storage disk in the second storage disk group belongs, and sends the sub-data request to the determined storage node, so that the determined storage node stores the second sub-data in a corresponding storage disk.

Optionally, in this embodiment of this application, the service module may concurrently execute the stored procedure of the first sub-data and the stored procedure of the second sub-data, or may store the second sub-data after the first sub-data is stored. This is not specifically limited in this embodiment of this application.

Further, after the first sub-data is stored in the first storage disk group, the service module further stores a correspondence between the first sub-data and a storage disk included in the first storage disk group. Therefore, in a subsequent data read process, the service module determines, according to the correspondence, the storage disk storing the first sub-data. Similarly, after the second sub-data is stored in the second storage disk group, the service module further stores a correspondence between the second sub-data and a storage disk included in the second storage disk group. Therefore, in a subsequent data read process, the service module determines, according to the correspondence, the storage disk storing the second sub-data. Generally, both the correspondence between the first sub-data and a storage disk included in the first storage disk group and the correspondence between the second sub-data and a storage disk included in the second storage disk group belong to metadata of the to-be-processed data.

S804 (optional): When remaining storage space of a storage disk in the first storage disk group is zero, the management module sets the storage disk in the first storage disk group to a first energy saving state; and when remaining storage space of a storage disk in the second storage disk group is zero, the management module sets the storage disk in the second storage disk group to a second energy saving state.

The management module manages each storage disk. The remaining storage space of the storage disk in the first storage disk group is zero, in other words, data does not need to be written into the first storage disk group temporarily. The first storage disk group is included in the first storage disk cluster. Therefore, the management module sets the storage disk in the first storage disk group to the first energy saving state, and this effectively reduces power consumption of the storage disk in the first storage disk group.

Similarly, the remaining storage space of the storage disk in the second storage disk group is zero, in other words, data does not need to be written into the second storage disk group temporarily. The second storage disk group is included in the second storage disk cluster. Therefore, the management module sets the storage disk in the second storage disk group to the second energy saving state, and this effectively reduces power consumption of the storage disk in the second storage disk group.

In conclusion, for the to-be-processed data, the first sub-data of the to-be-processed data is stored in the first storage disk group, and the second sub-data of the to-be-processed data is stored in the second storage disk group. The first storage disk group belongs to the first storage disk cluster in the first energy saving state, and the second storage disk group belongs to the second storage disk cluster in the second energy saving state. Because the power consumption of the storage disk in the energy saving state is comparatively low, compared with the prior art, a storage manner for the to-be-processed data effectively reduces the power consumption of the storage disk.

S800 to S804 implement storage of the to-be-processed data. After the to-be-processed data is stored, the service module may further read the to-be-processed data based on an actual requirement. The following S805 to S810 are a process of reading the to-be-processed data.

S805: The service module receives a read request including an identifier of the to-be-processed data.

S806: The service module reads metadata of the to-be-processed data based on the identifier of the to-be-processed data, to determine the first storage disk group and the second storage disk group.

With reference to the foregoing description, it can be learned that the service module stores the correspondence between the first sub-data and a storage disk included in the first storage disk group, and stores the correspondence between the second sub-data and a storage disk included in the second storage disk group.

Specifically, after receiving the read request including the identifier of the to-be-processed data, the service module determines, according to the correspondence between the first sub-data and a storage disk included in the first storage disk group, the storage disk included in the first storage disk group, and determines, according to the correspondence between the second sub-data and a storage disk included in the second storage disk group, the storage disk included in the second storage disk group.

S807: The service module sends a wakeup command to the management module, to indicate the management module to wake up the storage disk in the first storage disk group and the storage disk in the second storage disk group.

S808: The management module wakes up the storage disk in the first storage disk group and the storage disk in the second storage disk group, and sends, to the service module, a response message used to indicate that the wakeup succeeds.

The management module manages each storage disk. After receiving the wakeup command, the management module detects the state of the storage disk in the first storage disk group and the state of the storage disk in the second storage disk group. If the storage disk in the first storage disk group is in the first energy saving state, the management module wakes up the storage disk in the first storage disk group. If the storage disk in the first storage disk group is in the readable state, the management module retains the state of the storage disk. Similarly, if the storage disk in the second storage disk group is in the second energy saving state, the management module wakes up the storage disk in the second storage disk group. If the storage disk in the second storage disk group is in the readable state, the management module retains the state of the storage disk.

In this embodiment of this application, that the management module wakes up a specific storage disk means that the management module sends a wakeup request to a storage module of a storage node to which the storage disk belongs, to request to switch a state of the storage disk from the energy saving state to the readable state. It can be learned from the foregoing description that it takes a period of time for the storage disk to switch from the energy saving state to the readable state. The period of time is referred to as the wakeup latency. Wakeup latencies of storage disks in different energy saving states are different.

S809: The service module reads the first sub-data from the first storage disk group, and after the first sub-data is read, reads the second sub-data from the second storage disk cluster.

After receiving the response message, the service module determines that the storage disk in the first storage disk group and the storage disk in the second storage disk group are woken up. Further, the service module sequentially reads the first sub-data and the second sub-data based on the access sequence.

The wakeup latency of the first energy saving state is shorter than the wakeup latency of the second energy saving state, and the size of the first sub-data is determined based on the wakeup latency of the first energy saving state and the wakeup latency of the second energy saving state. Therefore, after the service module reads the first sub-data from the first storage disk group, a wakeup latency of the storage disk in the second storage disk group also basically ends. In this way, the service module can read the second sub-data from the second storage disk group, and a latency requirement of data is ensured.

S810 (optional): After the service module reads the first sub-data, the management module sets the storage disk in the first storage disk group to the first energy saving state; and after the service module reads the second sub-data, the management module sets the storage disk in the second storage disk group to the second energy saving state.

Optionally, the management module may immediately set the storage disk in the first storage disk group to the first energy saving state after the service module reads the first sub-data; or the management module may wait for a first preset period of time after the service module reads the first sub-data, and then set the storage disk in the first storage disk group to the first energy saving state. Alternatively, after the service module reads the first sub-data and the second sub-data, the management module may set the storage disk in the first storage disk group to the first energy saving state. This is not specifically limited in this embodiment of this application.

Optionally, the management module may immediately set the storage disk in the second storage disk group to the second energy saving state after the service module reads the second sub-data; or the management module may wait for a second preset period of time after the service module reads the second sub-data, and then set the storage disk in the second storage disk group to the second energy saving state. Alternatively, after the service module reads the first sub-data and the second sub-data, the management module may set the storage disk in the second storage disk group to the second energy saving state. This is not specifically limited in this embodiment of this application.

The management module sets the storage disk in the first storage disk group to the first energy saving state and sets the storage disk in the second storage disk group to the second energy saving state. This effectively reduces the power consumption of the storage disk in the first storage disk group and the power consumption of the storage disk in the second storage disk group.

In conclusion, according to the data processing method provided in this embodiment of this application, the power consumption of the storage disk can be reduced, and the latency requirement of the data can be met.

The procedure of the data processing method shown in FIG. 8A and FIG. 8B is described only by using an example in which the to-be-processed data is split into the first sub-data and the second sub-data, and a quantity of pieces of sub-data is not limited.

In an actual application, if the distributed storage system includes m (m≥2) storage disk clusters, the service module may split the to-be-processed data into n (2≤n≤m) pieces of sub-data based on an actual requirement. Subsequently, the service module writes the n pieces of sub-data into storage disk clusters in different energy saving states.

For example, in a scenario in which the distributed system includes four storage disk clusters, if the to-be-processed data is insufficient to be split into four pieces of sub-data, the service module may split the to-be-processed data into three pieces of sub-data. If the to-be-processed data is insufficient to be split into three pieces of sub-data, the service module may split the to-be-processed data into two pieces of sub-data.

Specially, if the to-be-processed data is insufficient to be split into two pieces of sub-data, the service module does not need to split the to-be-processed data. For a method for reading and writing the to-be-processed data in the scenario, refer to the prior art. This is not specifically described in this embodiment of this application.

Specifically, a method for splitting, by the service module, the to-be-processed data is as follows. For an $i^{th}$ piece of sub-data of the to-be-processed data, in a case of i∈[1, n), the service module determines a size of the $i^{th}$ piece of sub-data based on a wakeup latency of the $i^{th}$ storage disk cluster, and a wakeup latency and access bandwidth of an $(i+1)^{th}$ storage disk cluster. In this way, the service module may determine the $i^{th}$ piece of sub data based on the size of the $i^{th}$ piece of sub data. Both the wakeup latency of the $i^{th}$ storage disk cluster and the wakeup latency of the $(i+1)^{th}$ storage disk cluster are preset. When i=n, the service module determines the size of the $i^{th}$ piece of sub data based on the size of the to-be-processed data and a size of each piece of sub data in determined (n−1) pieces of sub data, and determines the $i^{th}$ piece of sub data based on the size of the $i^{th}$ piece of sub data. The method is consistent with the method for splitting, by the service module, the to-be-processed data into the first sub-data and the second sub-data in S802.

In an implementation, with reference to Table 1, if the access bandwidth is the I/O bandwidth between the client and the storage disk, the bandwidth is represented by T, a wakeup latency of the A-state storage disk cluster is represented by DA, a wakeup latency of the B-state storage disk cluster is represented by DB, a wakeup latency of the C-state storage disk cluster is represented by DC, and a wakeup latency of the Z-state storage disk cluster is represented by DZ. The service module splits the to-be-processed data into four pieces of sub-data: sub-data 1, sub-data 2, sub-data 3, and sub-data 4. A size L1 of the sub-data 1 is: L1=T×(DB−DA+λ1), a size L2 of the sub-data 2 is: L2=T×(DC−DB+λ2), a size L3 of the sub-data 3 is: L3=T×(DZ−DC+λ3), and a size L4 of the sub-data 4 is: L4=the size of the to-be-processed data−L1−L2−L3. λ1, λ2, and λ3 are the time adjustment factors. For a definition of the time adjustment factor, refer to the foregoing description.

For example, if the I/O bandwidth between the client and the storage disk is 100 Mbps (megabit per second), that is, 12.5 MBps (megabyte per second). When DA is 10 milliseconds, DB is 1.5 seconds, DC is 4 seconds, DZ is 15 seconds, and λ at the millisecond level is ignored, L1=12.5×(1.5−0.01)=18.75 MB, L2=12.5×(4−1.5)=31.25 MB, L3=12.5×(15−4)=137.5 MB, and L4=the size of the to-be-processed data−L1−L2−L3.

After determining the n pieces of sub-data, the service module may determine, based on the access sequence of the sub-data and the wakeup latency of the storage disk cluster, the storage disk cluster in which each piece of sub-data is stored. For example, the service module writes the $i^{th}$ piece of sub-data into the $i^{th}$ storage disk cluster. The $i^{th}$ piece of sub-data is the $i^{th}$ piece of sub-data of the n pieces of sub-data that are sequentially arranged in the access sequence, and the $i^{th}$ storage disk cluster is the $i^{th}$ storage disk cluster of the m storage disk clusters that are sequentially arranged in ascending order of the wakeup latencies.

Figure 9:
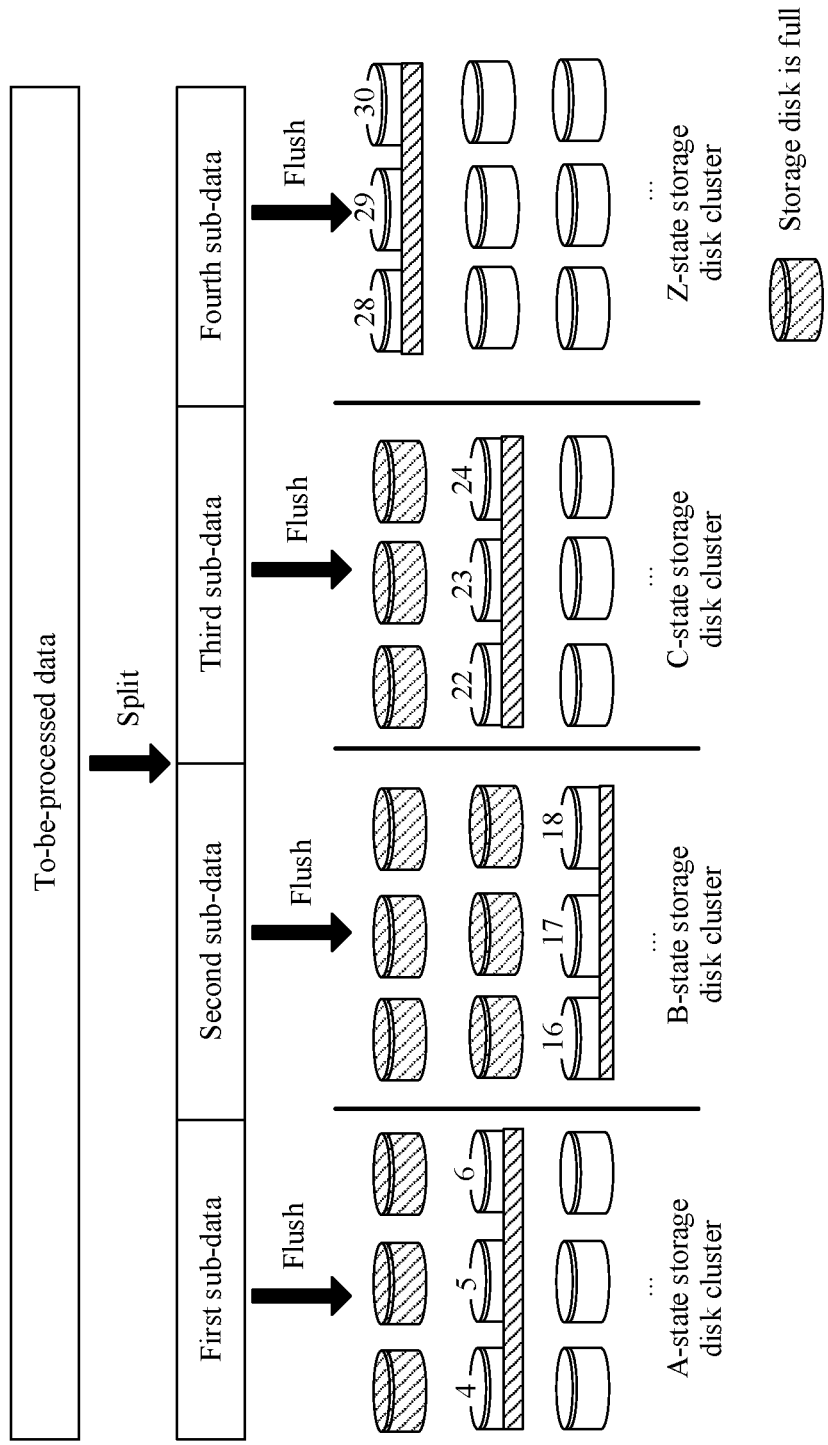
FIG. 9 is a schematic diagram of storage of sub-data according to an embodiment of this application.

For example, as shown in FIG. 9, the distributed storage system includes four storage disk clusters, and the four storage disk clusters are: the A-state storage disk cluster, the B-state storage disk cluster, the C-state storage disk cluster, and the Z-state storage disk cluster. The four storage disk clusters arranged in ascending order of the wakeup latencies are sequentially arranged as: the A-state storage disk cluster, the B-state storage disk cluster, the C-state storage disk cluster, and the Z-state storage disk cluster. The service module splits the to-be-processed data into four pieces of sub-data, and the four pieces of sub-data are sequentially arranged, based on the access sequence, as: first sub-data, second sub-data, third sub-data, and fourth sub-data. The service module writes the first sub-data into a storage disk 4, a storage disk 5, and a storage disk 6 of the A-state storage disk cluster. The service module writes the second sub-data into a storage disk 16, a storage disk 17, and a storage disk 18 of the B-state storage disk cluster. The service module writes the third sub-data into a storage disk 22, a storage disk 23, and a storage disk 24 of the C-state storage disk cluster. The service module writes the fourth sub-data into a storage disk 28, a storage disk 29, and a storage disk 30 of the Z-state storage disk cluster.

The service module writes the n pieces of sub-data into the storage disk clusters in different energy saving states. Subsequently, when the n pieces of sub-data need to be read, the service module first determines storage disks storing the sub-data, and then sequentially reads each piece of sub-data based on the access sequence. The procedure is similar to the data read procedure described in S805 to S810.

For example, as shown in FIG. 9, after receiving the read request including the identifier of the to-be-processed data, the service module determines that the storage disks storing the sub-data of the to-be-processed data include the storage disk 4, the storage disk 5, the storage disk 6, the storage disk 16, the storage disk 17, the storage disk 18, the storage disk 22, the storage disk 23, the storage disk 24, the storage disk 28, the storage disk 29, and the storage disk 30. The service module notifies the management module to wake up the storage disks. The first sub-data is first accessed. Because the first sub-data is stored in the storage disk 4, the storage disk 5, and the storage disk 6, the storage disk 4, the storage disk 5, and the storage disk 6 are the storage disks in the A-state storage disk cluster, the wakeup latency of the A-state storage disk cluster is 10 milliseconds, and basically, the first sub-data can be read immediately. Therefore, the service module starts to read the first sub-data from the storage disk 4, the storage disk 5, and the storage disk 6. After the first sub-data is read, the storage disk 16, the storage disk 17, and the storage disk 18 are basically switched to the readable state. The service module continues to read the second sub-data from the storage disk 16, the storage disk 17, and the storage disk 18. After the second sub-data is read, the storage disk 22, the storage disk 23, and the storage disk 24 are basically switched to the readable state. The service module continues to read the third sub-data from the storage disk 22, the storage disk 23, and the storage disk 24. After the third sub-data is read, the storage disk 28, the storage disk 29, and the storage disk 30 are basically switched to the readable state. The service module continues to read the fourth sub-data from the storage disk 28, the storage disk 29, and the storage disk 30. In this way, the to-be-processed data can be successfully read.

The steps performed by the service module and the management module may be considered as steps performed by a processing module of a processing node.

According to the data processing method provided in this embodiment of this application, power consumption of the storage disk can be reduced, and a latency requirement of data can be met.

The foregoing mainly describes the solutions provided in the embodiments of this application from a perspective of the method. To implement the foregoing functions, the data processing method includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

It can be learned from the foregoing description that a distributed storage system provided in an embodiment of this application includes at least one processing node. The at least one processing node includes at least one processor and at least one memory. The at least one memory is configured to: store a computer instruction, and when the at least one processor invokes the computer instruction, perform the foregoing data processing method.

Optionally, the at least one processor and the at least one memory are deployed on a same processing node.

Optionally, when the at least one processing node includes at least two processors, the at least two processors may be located on a same processing node, or may be located on different processing nodes. This is not specifically limited in this embodiment of this application.

For example, if the at least one processing node in this embodiment of this application includes a first processor and a second processor, the first processor may be configured to receive a read request including an identifier of to-be-processed data. The second processor is configured to: in response to the read request received by the first processor, read first sub-data from a first storage disk cluster, and after the first sub-data is read, read second sub-data from a second storage disk cluster. The first processor and the second processor may be located on a same processing node, or may be located on different processing nodes.

Another embodiment of this application further provides a computer-readable storage medium. The computer-readable storage medium stores an instruction. When the instruction runs on a computer (for example, the at least one processing node), the method procedure shown in the foregoing method embodiment is performed.

In another embodiment of this application, a computer program product is further provided. The computer program product includes a computer instruction. When a computer (for example, the at least one processing node) invokes the computer instruction, the method procedure shown in the foregoing method embodiment is performed.

All or some of the foregoing embodiments may be implemented by means of software, hardware, firmware, or any combination thereof. When a software program is used to implement the embodiments, all or some of the embodiments may be implemented in a form of a computer program product. The computer program product includes one or more computer instructions. When the computer program instruction is loaded and executed on the computer, the procedure or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data terminal, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions about implementations allow a person skilled in the art to understand that, for the purpose of convenient and brief description, division of the foregoing function modules is using as an example for illustration. In an actual application, the foregoing functions can be allocated to different modules for implementation based on a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A data processing method, applied to a distributed storage system, wherein the distributed storage system comprises at least one processing node and at least two storage nodes, and storage disks of the at least two storage nodes comprise at least two storage disk clusters, wherein the at least two storage disk clusters are configured with at least two energy saving states, and a processing module is deployed on the at least one processing node; and the data processing method comprises:

receiving, by the processing module, a read request comprising an identifier of to-be-processed data, wherein the to-be-processed data is stored in the at least two storage nodes, and the to-be-processed data comprises first sub-data and second sub-data;

reading, by the processing module, metadata of the to-be-processed data based on the identifier of the to-be-processed data, to determine a first storage disk cluster and a second storage disk cluster, wherein the first storage disk cluster comprises storage disks that are in the at least two storage nodes and that store the first sub-data, the second storage disk cluster comprises storage disks that are in the at least two storage nodes and that store the second sub-data, the first storage disk cluster is configured with a first energy saving state, the second storage disk cluster is configured with a second energy saving state, and a wakeup latency of the first energy saving state is shorter than a wakeup latency of the second energy saving state, wherein an access sequence of the first sub-data and an access sequence of the second sub-data are determined based on the wakeup latencies of the first and second storage disk cluster that store the first and second sub-data respectively; and reading, by the processing module, the first sub-data from the first storage disk cluster in accordance with the access sequence of the first sub-data, and after the first sub-data is read, reading the second sub-data from the second storage disk cluster in accordance with the access sequence of the second sub-data.

2. The data processing method according to claim 1, wherein before the reading, by the processing module, the first sub-data from the first storage disk cluster, the data processing method further comprises:

determining, by the processing module based on the metadata of the to-be-processed data, a first storage disk group in the first storage disk cluster and a second storage disk group in the second storage disk cluster, wherein a storage disk comprised in the first storage disk group is the storage disk that is in the first storage disk cluster and that stores the first sub-data, and a storage disk comprised in the second storage disk group is the storage disk that is in the second storage disk cluster and that stores the second sub-data;

the reading, by the processing module, the first sub-data from the first storage disk cluster comprises:

reading, by the processing module, the first sub-data from the first storage disk group; and the reading, by the processing module, the second sub-data from the second storage disk cluster comprises:

reading, by the processing module, the second sub-data from the second storage disk group.

3. The data processing method according to claim 2, wherein after the determining, by the processing module, a first storage disk group in the first storage disk cluster and a second storage disk group in the second storage disk cluster, the data processing method further comprises:

determining, by the processing module, that the storage disk in the first storage disk group and the storage disk in the second storage disk group are woken up.

4. The data processing method according to claim 3, wherein after the reading, by the processing module, the first sub-data from the first storage disk group, the data processing method further comprises:

setting, by the processing module, the storage disk in the first storage disk group to the first energy saving state; and after the reading, by the processing module, the second sub-data from the second storage disk group, the data processing method further comprises:

setting, by the processing module, the storage disk in the second storage disk group to the second energy saving state.

5. The data processing method according to claim 1, wherein before the receiving, by the processing module, a read request comprising an identifier of to-be-processed data, the data processing method further comprises:

receiving, by the processing module, a write request comprising the to-be-processed data; splitting, by the processing module, the to-be-processed data into the first sub-data and the second sub-data in response to the write request, wherein the access sequence of the first sub-data is before the access sequence of the second sub-data; and storing, by the processing module, the first sub-data in the first storage disk cluster, and storing the second sub-data in the second storage disk cluster.

6. The data processing method according to claim 5, wherein the splitting, by the processing module, the to-be-processed data into the first sub-data and the second sub-data comprises:

calculating, by the processing module, a size of the first sub-data based on the wakeup latency of the first energy saving state, and the wakeup latency and access bandwidth of the second energy saving state, and determining the first sub-data, wherein both the wakeup latency of the first energy saving state and the wakeup latency of the second energy saving state are preset; and calculating, by the processing module, a size of the second sub-data based on a size of the to-be-processed data and the size of the first sub-data, and determining the second sub-data.

7. The data processing method according to claim 5, wherein the storing, by the processing module, the first sub-data in the first storage disk cluster, and storing the second sub-data in the second storage disk cluster comprises:

storing, by the processing module, the first sub-data in the first storage disk group, and storing the second sub-data in the second storage disk group; wherein the data processing method further comprises:

when remaining storage space of the storage disk in the first storage disk group is zero, setting, by the processing module, the storage disk in the first storage disk group to the first energy saving state; and when remaining storage space of the storage disk in the second storage disk group is zero, setting, by the processing module, the storage disk in the second storage disk group to the second energy saving state.

8. A distributed storage system, wherein the distributed storage system comprises at least one processing node and at least two storage nodes, and storage disks of the at least two storage nodes comprise at least two storage disk clusters, wherein the at least two storage disk clusters are configured with at least two energy saving states, a processing module is deployed on the at least one processing node, and the processing module is configured to perform the data processing method according to claim 1.

9. A distributed storage system, wherein the distributed storage system comprises at least two storage nodes, and storage disks of the at least two storage nodes comprise at least two storage disk clusters, wherein a first storage disk cluster in the at least two storage disk clusters is in a first energy saving state, a second storage disk cluster in the at least two storage disk clusters is in a second energy saving state, and a wakeup latency of the first energy saving state is shorter than a wakeup latency of the second energy saving state;

the at least two storage disk clusters store to-be-processed data, wherein the to-be-processed data comprises first sub-data and second sub-data; and the first storage disk cluster stores the first sub-data, and the second storage disk cluster stores the second sub-data; wherein an access sequence of the first sub-data and an access sequence of the second sub-data are determined based on the wakeup latencies of the first and second storage disk cluster that store the first and second sub-data respectively.

10. The distributed storage system according to claim 9, wherein the distributed storage system further comprises at least one processing node, and the at least one processing node stores metadata of the to-be-processed data, wherein the metadata of the to-be-processed data records a correspondence between the first storage disk cluster and the first sub-data, and a correspondence between the second storage disk cluster and the second sub-data.

\* \* \* \* \*